United States Patent [19]
Skidmore et al.

[11] Patent Number: 5,832,915
[45] Date of Patent: Nov. 10, 1998

[54] FIREPLACE GRILL AND METHOD

[75] Inventors: Keith Skidmore, Newton; David Linnebur, Derby; Randall May, Andover, all of Kans.

[73] Assignee: The Colman Company, Inc., Wichita, Kans.

[21] Appl. No.: 801,518

[22] Filed: Feb. 18, 1997

[51] Int. Cl.$^6$ ........................................... F24C 1/16
[52] U.S. Cl. .................. 126/9 R; 126/25 R; 126/304 R; 126/306; 126/519
[58] Field of Search ................ 126/9 R, 25 R, 126/38, 9 A, 506, 9 B, 304 R, 304 A, 305, 306, 41 R, 519

[56] References Cited

U.S. PATENT DOCUMENTS

| | | |
|---|---|---|
| 1,924,824 | 8/1933 | Yeager ..................................... 126/306 |
| 2,073,813 | 3/1937 | Slezak ...................................... 126/9 R |
| 2,477,529 | 7/1949 | Sprinkle et al. .................... 126/304 R |
| 3,002,511 | 10/1961 | Arcuri . |
| 3,105,483 | 10/1963 | Bryan . |
| 3,177,864 | 4/1965 | Bowman ............................. 126/304 R |
| 4,418,678 | 12/1983 | Erickson . |
| 4,535,749 | 8/1985 | Schlosser et al. . |
| 4,561,417 | 12/1985 | Chen . |

Primary Examiner—James C. Yeung
Attorney, Agent, or Firm—Fitzpatrick, Cella, Harper & Scinto

[57] ABSTRACT

The fireplace grill features dual purpose legs which are inverted to snap over a lid holding the entire unit together for compact storage and transport. Under normal operating condition, the legs are inverted and are deployed downwardly and outwardly to raise the fireplace above the ground.

17 Claims, 3 Drawing Sheets

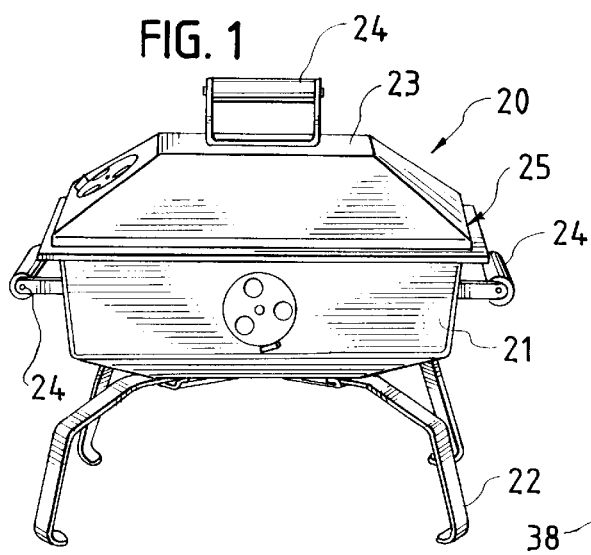
FIG. 1
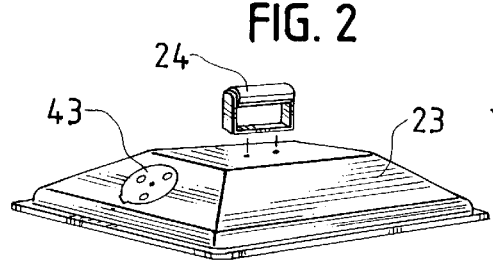
FIG. 2
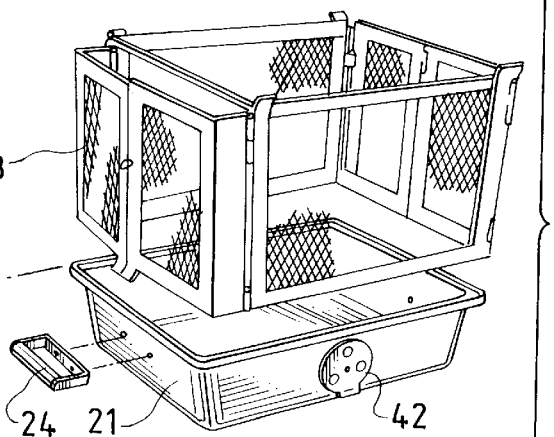
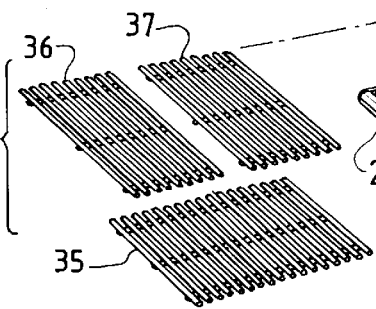
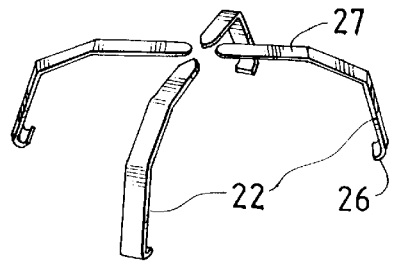
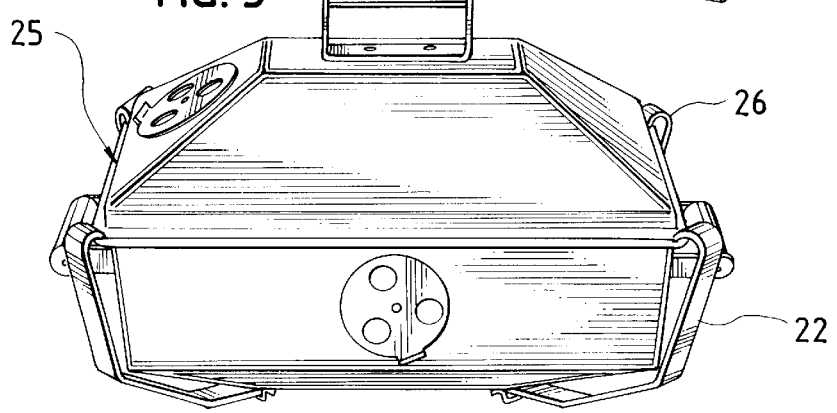
FIG. 3

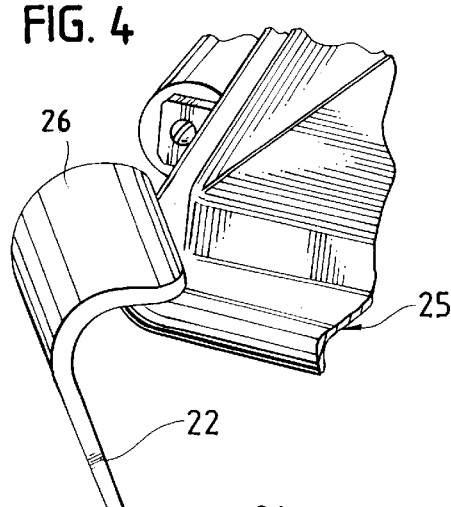
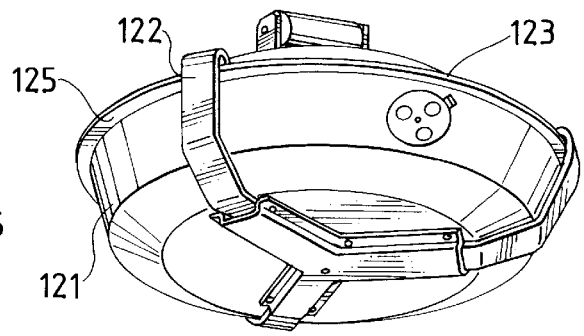
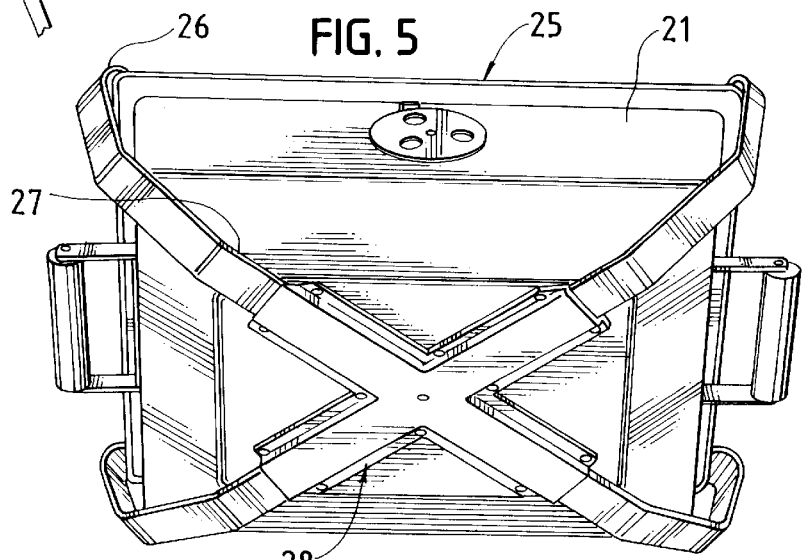
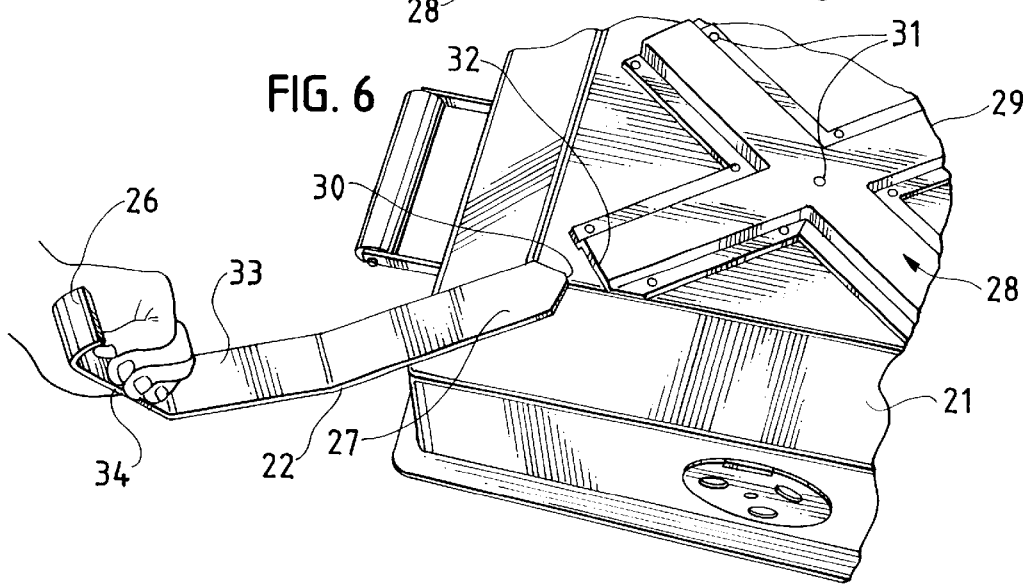

FIREPLACE GRILL AND METHOD

BACKGROUND AND SUMMARY OF INVENTION

This invention relates to a fireplace grill and, more particularly, to a fireplace grill with dual-purpose legs.

Leg-equipped grills, viz., "barbecues" have been used for many years. Portable grills have had foldable legs for compactness but not in the way of the instant invention. The legs were necessary to keep the firebox off the ground or other support surface. The invention utilizes these necessary legs in a dual-purpose role: the second being as a fastening means to hold the entire product together for convenient handling and storage. This invention meets several key requirements. It reduces the number of components necessary to fasten closed. It meets the requirement of quickly assembling and disassembling with little effort. The leg attachment method is very intuitive and requires no tools. Also, there are no small, loose parts (bolts, nuts, washers) which too often become misplaced in the field. And, equally, importantly, the invention keeps the fireplace/grill compact minimizing vehicle storage space.

The invention includes a box having a bottom wall and an upstanding sidewall providing an open top, a lid removably covering the open top and equipped with a perimetric flange. The exterior of the bottom wall is equipped with intersecting slots adapted to receive at least three legs. Each leg is equipped with an arcuate free end and a generally straight flat opposite end—the flat end being received in one of the slots. The arcuate free ends in one orientation of the legs when the opposite ends are received in the slots providing feet for supporting the box above the ground or other generally flat surface. The arcuate free ends in the other orientation of the legs when the opposite ends are inverted and received in the slots engaging the lid flange to hold the grill tightly together.

Other objects and advantages may be seen in the details of the ensuing specification.

BRIEF DESCRIPTION OF DRAWING

The invention is described in conjunction with the accompanying drawing in which FIG. 1 is a front perspective view of an embodiment of the invention;

FIG. 2 is an exploded perspective view of the grill of FIG. 1 but additionally including a screen interposed between the box and the lid;

FIG. 3 is a perspective view of the grill of FIG. 1 or FIG. 2 reassembled for transport;

FIG. 4 is an enlarged fragmentary perspective view showing the engagement of the arcuate end of a leg with the perimetric flange of the lid as would be the case when the grill is reassembled for transport or storage;

FIG. 5 is a perspective view taken from the bottom of the grill in its storage condition;

FIG. 6 is a fragmentary perspective view showing how a leg is inserted into slot means on the underside of the box;

FIG. 7 is a perspective view of an alternative embodiment of the invention wherein the box is circular and three legs are provided;

DETAILED DESCRIPTION

Figure 8:
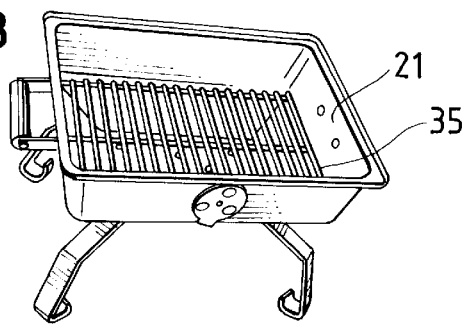
FIG. 8 is a perspective view showing the grill in partial assembled form, i.e., with an open topped box and with the charcoal/wood grate being installed within the box.

In the illustration given and with reference to FIG. 1 the numeral 20 designates generally the inventive grill which is seen to include a box 21, legs 22 and a lid 23. Suitable handles as at 24 are provided at each side of the box and also for the lid 23. An advantageous feature of the invention is the provision of a perimetric flange generally designated 25 on the lid 23.

The advantageous feature of the perimetric flange 25 can be readily appreciated from a consideration of FIG. 3 where the legs 22 have been inverted or reversed from their arrangement in FIGS. 1 and 2 and thus the arcuate free ends 26 engage the perimetric flange when in the FIG. 3 stored condition. When in the operating or "grill" condition, the legs are oriented to position the free arcuate ends 26 downwardly to serve as ground-engaging supports.

The invention also is advantageous in providing relatively flat or straight opposite ends for each leg as at 27 (see FIG. 2).

The invention further includes, on the underside of the box 21 slot means generally designated 28—see FIGS. 5 and 6.

A comparison of FIGS. 5 and 6 quickly shows the operation of the invention, particularly the method of handling the legs. In FIG. 5, for example, the legs are in the orientation or condition where the straight or flat ends 27 are received within the slot means 28 and the arcuate free ends 26 are clamping the lid 23 against the box 21. More particularly, the legs are clamping the perimetric flange 25 of the lid 23.

Then, in FIG. 6, the legs 22 have been removed from their positioning within the slot means 28 and reversed so that the free arcuate ends 26 are positioned downwardly. The flat ends 27 are shown in the process of being installed within the slot means so that the condition depicted in FIG. 1 is achieved.

To understand the practice of the invention, particularly the inventive method, the steps involved in (1) assembly and (2) disassembly will now be described.

Assembly

If the grill is new, the handles 24 (see FIG. 2) are attached to the lid 23 and the firebox 21 as indicated. The next step is to deploy the legs. If the unit is new, the legs would come within the shipping box but if the unit has been stored in the FIG. 3 condition, then the legs have to be detached to individual condition as shown in the bottom of FIG. 2.

The legs 22 are then inserted into the slots 29 (see FIG. 6) of the slot means 28. The full insertion of the legs into their respective slots can be readily appreciated when no further insertion is possible as by the tip 30 of the flat end 27 of each leg 22 encountering a central securing pin 31 provided as part of the slot means 28. Other fasteners for the slot means 28 to the underside of the firebox 21 are also designated by the numeral 31 and are provided at various positions along the length of the various individual slots 29. As an example of the practice of the invention, where the lid has horizontal dimensions of about 16"×21", each slot has a width of about 1 ½ and a depth slightly over ¼". And the length from the center 30 to the entry end 32 is about 5".

Each leg 22 has a length of the flat portion 27 of the order of 6 ½" with the intermediate portion 33 being about 4" long and the leg portion 34 having a length (exclusive of the arcuate portion 26) of about 5". The angle included between the leg segments 27 and 33 is 155° and that between the segments 33 and 34 about 130°. Lastly, the included angle in the arcuate end 26 is about 70°.

After the legs have been installed, the next step is to install the charcoal/wood grate 35 (see FIG. 8) within the firebox 21. The grate can be seen in the exploded version of FIG. 2. Also seen in FIG. 2 are the two cooking grates 36, 37. These are provided in two parts in order to conveniently store the same between uses—to be explained in conjunction with FIG. 12.

Figure 9:
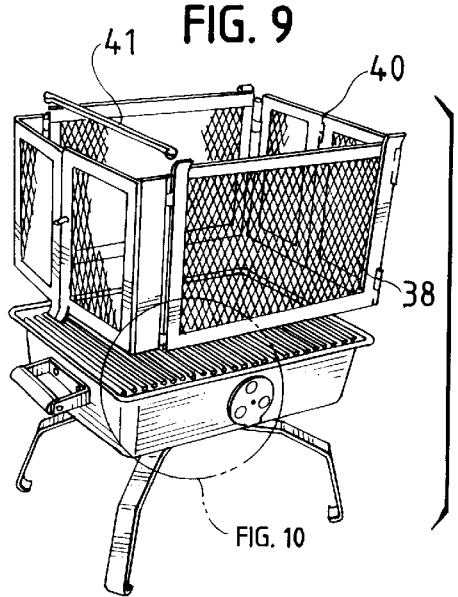
FIG. 9 is another perspective view showing a later stage in the assembly of the grill preparatory to use and shows the cooking grate installed and a perimetric screen about to be installed on the box.
Figure 10:
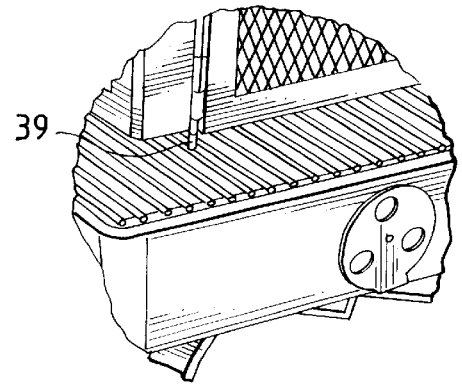
FIG. 10 is a fragmentary perspective view of a corner of the box and screen of FIG. 9 showing further details of connection.
Figure 11:
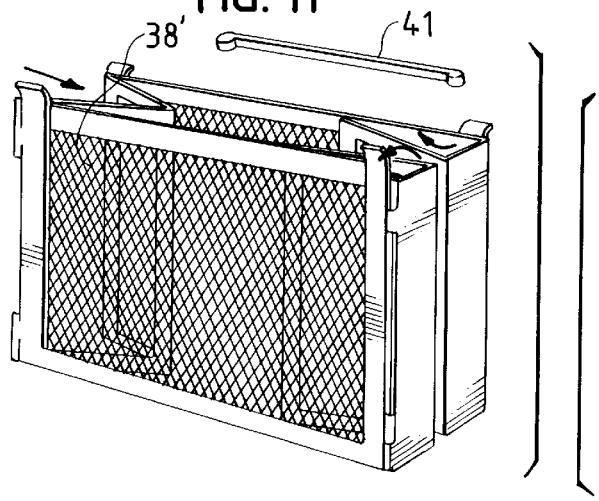
FIG. 11 is a perspective exploded view of the screen components folded in condition for storage.

The next step is to unfold the screen (from its folded condition of FIG. 11) and install it in the fashion indicated in FIG. 9. The screen 38 is equipped with hinge pins as at 39 (se FIG. 10) both on the front door hinge and the rear center hinge 40 (see the upper right hand portion of FIG. 9). These are inserted in holes provided in the perimetric flange 25.

Next, a bracket 41—see the upper left portion of FIG. 19— is slid over the front door hinge pins at the top of the screen so as to maintain the screen in rectangular configuration. Thereafter, the lid 23 is placed over the screen and the assembly is ready for use.

Normally operation is to install the fuel—charcoal/wood before the cooking grates 36, 37 are installed. After the screen 38 has been installed, the lid 23 is placed over the firebox to contain heat and smoke. The heat can be regulated by adjusting the air restrictors or vents 42 in the firebox 21 and 43 in the lid 23. Fully open vents offer maximum heat.

Disassembly

Figure 12:
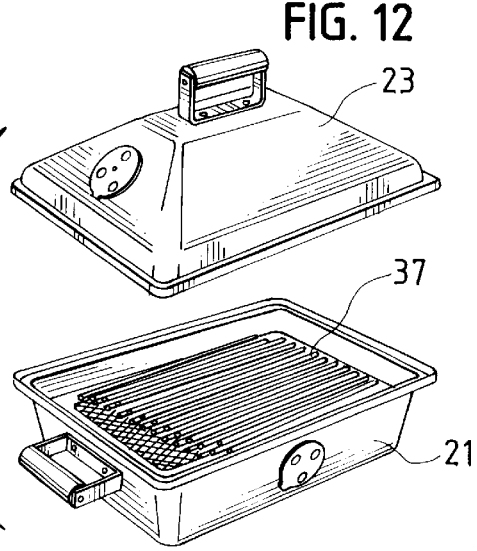
FIG. 12 is an exploded perspective view of the components stored within the grill box preparatory to completion to the storage condition.

Once cooled ashes have been properly disposed of, the unit is ready for collapsing to the storage mode. This involves removing the lid 23, the screen 38 and the cooking grates 36, 37 from the firebox 21. Thereafter the bracket 41 is removed from the screen 38 and the screen is folded into the compact shape designated 38' in FIG. 11. This is then laid inside the firebox 21 and the cooking grates are placed on top of the screen as shown in FIG. 12. Thereafter, the lid 23 is placed on the top of the firebox.

Now, with the legs upside down—the form shown in FIG. 5, the flat ends 26 are inserted into the slots 29 and the arcuate ends 26 are gently pushed over the lid to firmly engage the generally flat perimetric flange 25.

Summary

The fireplace grill is advantageously a deep drawn sheet metal box approximately 20"×15" in horizontal dimensions and 7" deep. A mating lid 23 comes with the box 21 as well as a framed expanded metal screen 38. The grill is equipped to burn either normal length firewood or charcoal. Two wire grates are also included. There is the wood or charcoal supporting grate 35 (see FIG. 2) and the other a pair 36, 37 for supporting the food to be grilled.

Aside from offering a place to build a fire and/or cook, the fireplace/grill is designed for portability and storage compactness. The intent for consumers to use this product at the beach, campsite, or any remote location away from home. Thus, it is advantageous that the unit take up minimal space, easily deploy for use, readily disassemble for transport and easily be carried by one individual so that the legs 22, which support the fireplace box 21, do not take up unnecessary space.

The inventive dual-purpose legs are constructed to lock the fireplace/grill in compact storage condition. As seen in FIGS. 1 and 3, the legs are seen in both the deployed and stored position, respectively. The legs are held in place in both positions by an X-shaped leg bracket 28 including four slots 29. Although the principal embodiment described thus far has four legs, it is possible for a different number of legs to be employed as for example in the embodiment of FIG. 7. There, three legs 122 are employed in connection with the firebox 121 and the lid 123. In the illustration of FIG. 7 the perimetric flange 125 is circular as contrasted to being rectangular in the showing, for example, in FIG. 4 where the leg 22 has its arcuate free end 26 engaging a corner 45 of the perimetric flange.

The legs 22 or 122 fit somewhat snugly within the bracket or slot means 28 to prevent them from sliding out when the unit is dragged on rough ground.

When disassembling the fireplace/grill, the screen 38 fits inside the firebox 21 between the grates and the lid which fits over the box. Then, the legs 22 are pulled out of the leg bracket 28, turned 180° over and reinserted into the bracket 28. The legs follow the profile of the bottom box in each one of the four corners and with a little extra push, the free end of each leg fits snugly over the perimetric flange of the lid to hold the entire unit together tightly. The fireplace/grill can now be transported by the handle on the lid or the two side handles on the bottom box.

While in the foregoing specification a detailed description of the invention has been set down for the purpose of illustration, many variations in the details hereingiven may be made by those skilled in the art without departing from the spirit and scope of the invention.

We claim:

1. A fireplace/grill product comprising a box having a bottom wall and an upstanding sidewall providing an open top, a lid removably covering said open top and equipped with a perimetric flange, the exterior of said bottom wall being equipped with intersecting slot means adapted to receive at least three legs, said legs each being equipped with an arcuate free end and a generally straight flat opposite end received in said slot means, said arcuate free ends in one orientation of said legs when said opposite ends are received in said slot means providing feet for supporting said box above the ground or other generally flat surface and said arcuate free ends in the other orientation of said legs when said opposite ends are received in said slot means engaging said lid flange to hold said product tightly together.

2. The product of claim 1 in which said lid flange has an upstanding perimetric bead.

3. The product of claim 1 in which said arcuate free ends are sized and constructed to overlie said perimetric bead.

4. The product of claim 1 in which said box has four sides and said slot means is in "X" configuration.

5. The product of claim 4 in which said lid and the perimetric flange thereof are also four-sided to provide corners and said arcuate free ends of said legs engage said corners.

6. The fireplace/grill product comprising a generally rectangular box having a bottom wall and an upstanding sidewall providing an open top, a lid removably covering said open top and equipped with a perimetric flange, the exterior of said bottom wall being equipped with intersecting slot means adapted to receive at four legs, said legs each being equipped with an arcuate free end and a generally straight flat opposite end received in said slot means, said arcuate free ends in one orientation of said legs when said opposite ends are received in said slot means providing feet for supporting said box above the ground or other generally flat surface and said arcuate free ends in the other orientation of said legs when said opposite ends are received in said slot means engaging said lid flange to hold said product tightly together.

7. The product of claim 6 in which said lid flange has an upstanding perimetric bead.

8. The product of claim 6 in which said arcuate free ends are sized and constructed to overlie said perimetric bead.

9. The product of claim 6 in which said box has four sides and said slot means is in "X" configuration.

10. The product of claim 6 in which said lid and the perimetric flange thereof are also four-sided to provide corners and said arcuate free ends of said legs engage said corners.

11. The product of claim 6 in which a foldable screen is interposed between said lid and said box.

12. The product of claim 11 in which said screen is equipped with a bracket to maintain the same in rectangular configuration.

13. A method of operating a fireplace/grill product comprising providing a box having a bottom wall and an upstanding sidewall providing an open top, a lid removably covering said open top and equipped with a perimetric flange, the exterior of said bottom wall being equipped with intersecting slot means adapted to receive four legs, said legs each being equipped with an arcuate free end and a generally straight flat opposite end for receipt in said slot means, orienting said arcuate free end downwardly and inserting said opposite ends into said slot means to provide feet for supporting said box above the ground or other generally flat surface, and for storing said product orienting said arcuate free ends upwardly and inserting said opposite ends in said slot means while engaging said arcuate free ends with said lid flange to hold said product tightly together.

14. The method of claim 13 in which said providing step includes providing grills, and installing said grill within said box incident to storing said product.

15. The method of claim 13 in which said providing step also includes providing a foldable screen, erecting said screen into rectangular configuration and installing the same on said box, and, incident to storing said product, collapsing said screen and placing the same on top of said grills within said box prior to covering with said lid.

16. The method of claim 13 in which said providing step includes providing said perimetric flange with four corners and the step of storing includes positioning said arcuate ends over said corners.

17. The method of claim 16 in which said providing step includes providing said perimetric flange with a bead and engaging said free arcuate ends of said legs over said bead.

* * * * *